(12) United States Patent
Gehlot et al.

(10) Patent No.: US 9,353,754 B2
(45) Date of Patent: May 31, 2016

(54) MULTI-STAGE AXIAL COMPRESSOR WITH COUNTER-ROTATION USING ACCESSORY DRIVE

(71) Applicant: Embry-Riddle Aeronautical University, Inc., Daytona Beach, FL (US)

(72) Inventors: Vinod Gehlot, Bangalore (IN); Magdy S. Attia, Ormond Beach, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 776 days.

(21) Appl. No.: 13/800,836

(22) Filed: Mar. 13, 2013

(65) Prior Publication Data

US 2014/0286749 A1 Sep. 25, 2014

Related U.S. Application Data

(60) Provisional application No. 61/610,047, filed on Mar. 13, 2012.

(51) Int. Cl.
| | |
|---|---|
| *F04D 19/02* | (2006.01) |
| *F02C 3/067* | (2006.01) |
| *F01D 1/24* | (2006.01) |
| *F04D 29/059* | (2006.01) |

(52) U.S. Cl.
CPC ...... *F04D 19/02* (2013.01); *F01D 1/24* (2013.01); *F02C 3/067* (2013.01); *F04D 19/024* (2013.01); *F04D 29/059* (2013.01); *F05D 2250/44* (2013.01)

(58) Field of Classification Search
CPC ..... F04D 19/02; F04D 19/024; F04D 19/026; F02C 3/067; F02C 7/32; F05D 2250/44; F01D 1/24; F01D 5/26
See application file for complete search history.

(56) References Cited

U.S. PATENT DOCUMENTS

| | | | | |
|---|---|---|---|---|
| 2,461,931 | A | * | 2/1949 | MacLeish ............. F04D 17/127 415/106 |
| 2,702,985 | A | * | 3/1955 | Howell ................... F02C 3/067 415/147 |
| 3,379,366 | A | | 4/1968 | Garnier |
| 3,385,509 | A | | 5/1968 | Garnier |
| 3,391,540 | A | | 7/1968 | Bauger et al. |
| 3,524,318 | A | | 8/1970 | Bauger et al. |
| 3,673,802 | A | * | 7/1972 | Krebs ..................... F02C 3/067 415/79 |
| 3,775,023 | A | | 11/1973 | Davis et al. |

(Continued)

OTHER PUBLICATIONS

Mangtani, Amit, "Design and Development of a Multi-Stage Contra Rotating Mini Axial Compressor," Machinery & Equipment, Jun. 30, 2012.

*Primary Examiner* — Thomas Denion
*Assistant Examiner* — Xiaoting Hu
(74) *Attorney, Agent, or Firm* — Womble Carlyle Sandridge & Rice, LLP

(57) ABSTRACT

A multi-stage axial compressor for counter rotation. A first series of rotor blade assemblies are mounted on and rotate with the driveshaft, each rotor blade assembly of the first series comprising a rotating stage of the multi-stage axial compressor. A second series of rotor blade assemblies provide a counter-rotating stage of the multi-stage axial compressor. An accessory drive links the second series of rotor blade assemblies to the driveshaft and causes counter-rotation of the second series of rotor blade assemblies.

24 Claims, 7 Drawing Sheets

(56) References Cited

U.S. PATENT DOCUMENTS

| | | | | |
|---|---|---|---|---|
| 3,861,139 | A * | 1/1975 | Jones | F02C 3/067 416/171 |
| 4,159,624 | A * | 7/1979 | Gruner | F02C 3/107 60/268 |
| 4,192,137 | A * | 3/1980 | Chappell | F01D 5/03 415/65 |
| 4,251,987 | A | 2/1981 | Adamson | |
| 4,463,553 | A | 8/1984 | Boudigues | |
| 4,969,325 | A * | 11/1990 | Adamson | F02C 3/067 416/129 |
| 5,010,729 | A * | 4/1991 | Adamson | F02C 3/067 416/129 |
| 6,224,324 | B1 * | 5/2001 | Poinstingl | F01D 1/24 415/68 |
| 7,451,592 | B2 | 11/2008 | Taylor et al. | |
| 7,950,220 | B2 * | 5/2011 | Merry | F02C 3/067 415/65 |
| 7,966,806 | B2 | 6/2011 | Henry et al. | |
| 8,015,798 | B2 | 9/2011 | Norris et al. | |
| 8,061,968 | B2 | 11/2011 | Merry et al. | |
| 8,191,352 | B2 | 6/2012 | Schilling | |
| 2005/0172610 | A1 | 8/2005 | Bart et al. | |
| 2005/0183423 | A1 * | 8/2005 | Miller | F02C 7/32 60/802 |
| 2006/0248900 | A1 * | 11/2006 | Suciu | F02C 7/32 60/802 |
| 2010/0205934 | A1 * | 8/2010 | Gallet | F01D 1/24 60/268 |
| 2014/0147253 | A1 * | 5/2014 | Van Dam | F04D 13/028 415/122.1 |

\* cited by examiner

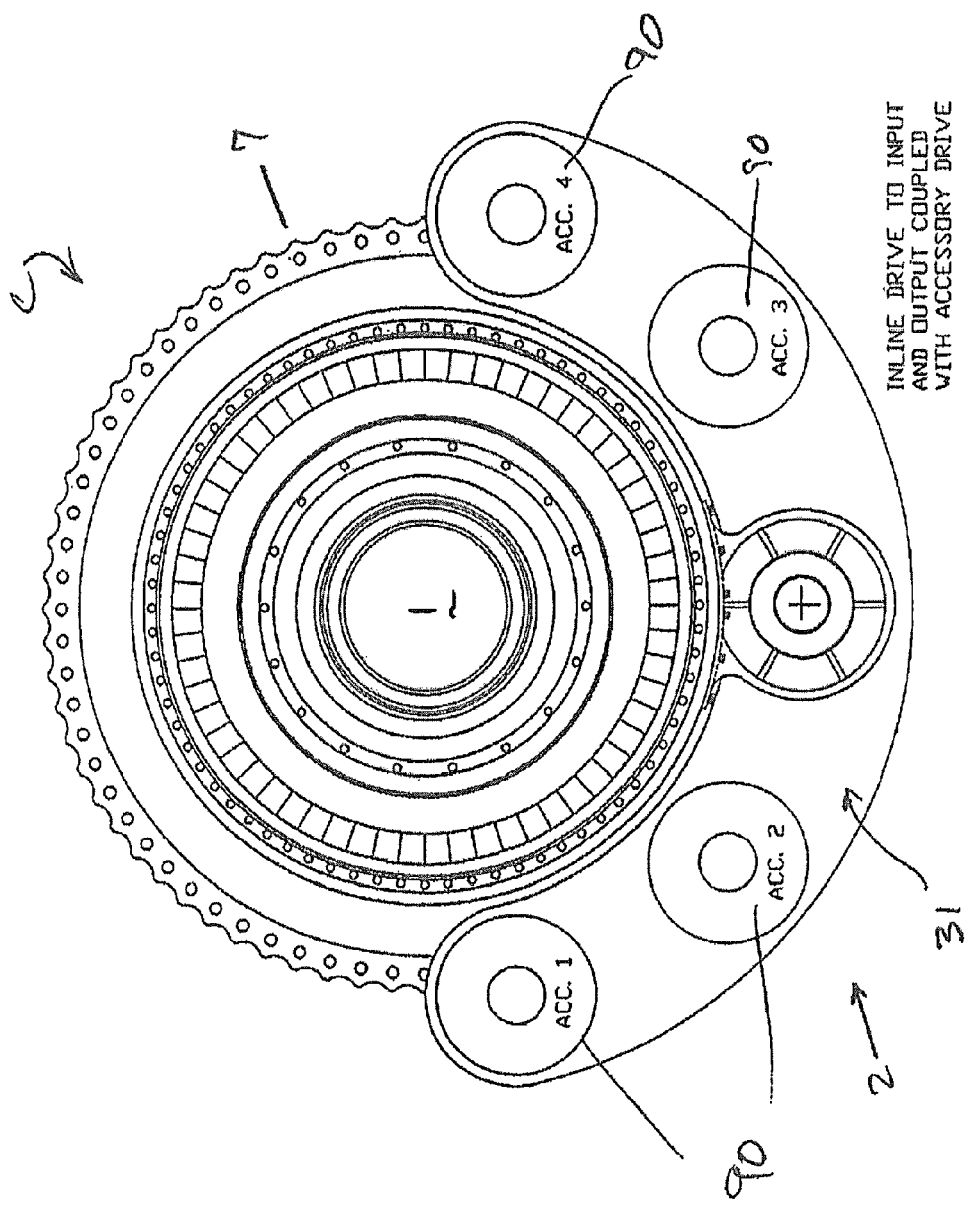

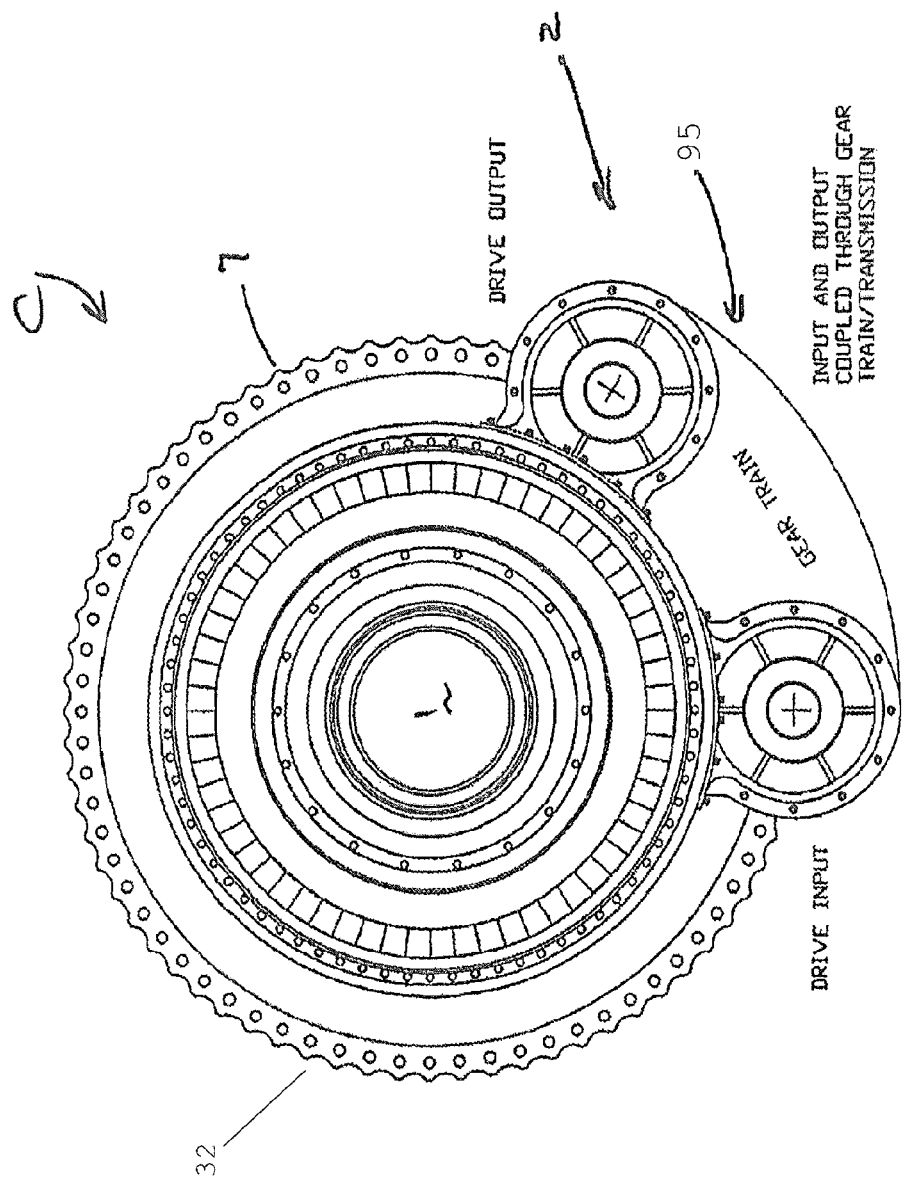

MULTI-STAGE AXIAL COMPRESSOR WITH COUNTER-ROTATION USING ACCESSORY DRIVE

CROSS-REFERENCE TO RELATED APPLICATIONS

This application claims benefit of U.S. Provisional Application No. 61/610,047, filed Mar. 13, 2012. The specification and drawings of the provisional patent application are specifically incorporated by reference herein. This application is related to co-pending and commonly assigned U.S. application Ser. No. 13/768,252, filed Feb. 15, 2013 which claims the benefit of U.S. Provisional Application No. 61/600,002 and U.S. Provisional Application No. 61/600,006, both filed Feb. 17, 2012.

TECHNICAL FIELD

Embodiments of the invention generally relate to axial compressors, and in particular to axial compressors incorporating rotating and sequential counter-rotating stages using an accessory drive to enable operation of the rotating and counter-rotating stages off a single driveshaft.

BACKGROUND

Axial compressors generally are designed to produce a substantially continuous flow of compressed gas or intake air passing therethrough to boost the power of gas turbine engines, such as jet engines for aircraft, high-speed ship engines, as well as some automotive reciprocating engines. In general, most axial compressors will include a series of airfoils, vanes or blades arranged in stages that include pairs of rotating and stationary airfoils. As an air flow enters the inlet of the compressor, the rotating airfoils (rotors) drive the air forwardly through the compressor, increasing the kinetic energy thereof, while the stationary or static airfoils (stators) diffuse the increased kinetic energy of the air flow passing thereover, causing a rise in pressure of the air flow. As a result, the pressure of the axial air flow through the compressor is significantly increased as it passes through multiple stages of the compressor.

However, the pressures and efficiencies provided by axial compressors can be limited by size and weight of the compressor. For example, in aircraft where minimizing compressor size and weight is critical to provide a lower profile, higher stage pressure ratios generated by such smaller compressors typically are provided at the expense of reduced compressor efficiency, especially as airflow speeds approach high Mach numbers. Attempts have been made to design compressors with counter-rotation to try to increase the efficiency, while reducing the size and number of axial compressors. One problem with such counter-rotating compressors has traditionally been that the blades of such counter-rotating compressors generally have been required to be on different driveshafts, which adds to the weight and complexity of the compressors, as well as potentially creating problems with synchronizing the operation of the counter-rotating blades, which further increases with an increased number of stages of the compressor. Additionally, in such systems, thrust loads can be transmitted from the compressor driveshafts(s) to the vanes or airfoils connected thereto, thus subjecting such vanes to additional wear and stresses that can affect their operating life.

SUMMARY

The embodiments disclosed are directed to axial compressors incorporating rotating and sequential counter-rotating stages using an accessory drive to enable operation of the rotating and counter-rotating stages off a single driveshaft.

In one embodiment, a multi-stage axial compressor for counter rotation includes a driveshaft; a first series of rotor blade assemblies mounted on and rotating with the driveshaft, each rotor blade assembly of the first series comprising a rotating stage of the multi-stage axial compressor; a second series of rotor blade assemblies, each rotor blade assembly of the second series comprising a counter-rotating stage of the multi-stage axial compressor; and an accessory drive linking the second series of rotor blade assemblies to the driveshaft and causing counter-rotation of the second series of rotor blade assemblies.

In another embodiment, a multi-stage axial compressor for counter rotation includes a driveshaft; a compressor housing including a rotating inner casing and a static outer casing; a first series of rotor blade assemblies mounted on and rotating with the driveshaft, each rotor blade assembly of the first series comprising a rotating stage of the multi-stage axial compressor; a second series of rotor blade assemblies mounted on the rotating inner casing, each rotor blade assembly of the second series comprising a counter-rotating stage of the multi-stage axial compressor; and an accessory drive connecting the second series of rotor blade assemblies to the driveshaft and causing counter-rotation of the second series of rotor blade assemblies.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

FIG. 6 is an end view of an alternative embodiment of the axial compressor with the accessory drive including a gear box transmission.

FIG. 7 is an end view of another embodiment of the axial compressor with the accessory drive including a drive train transmission for driving the counter-rotating vanes.

DETAILED DESCRIPTION

Figure 1:
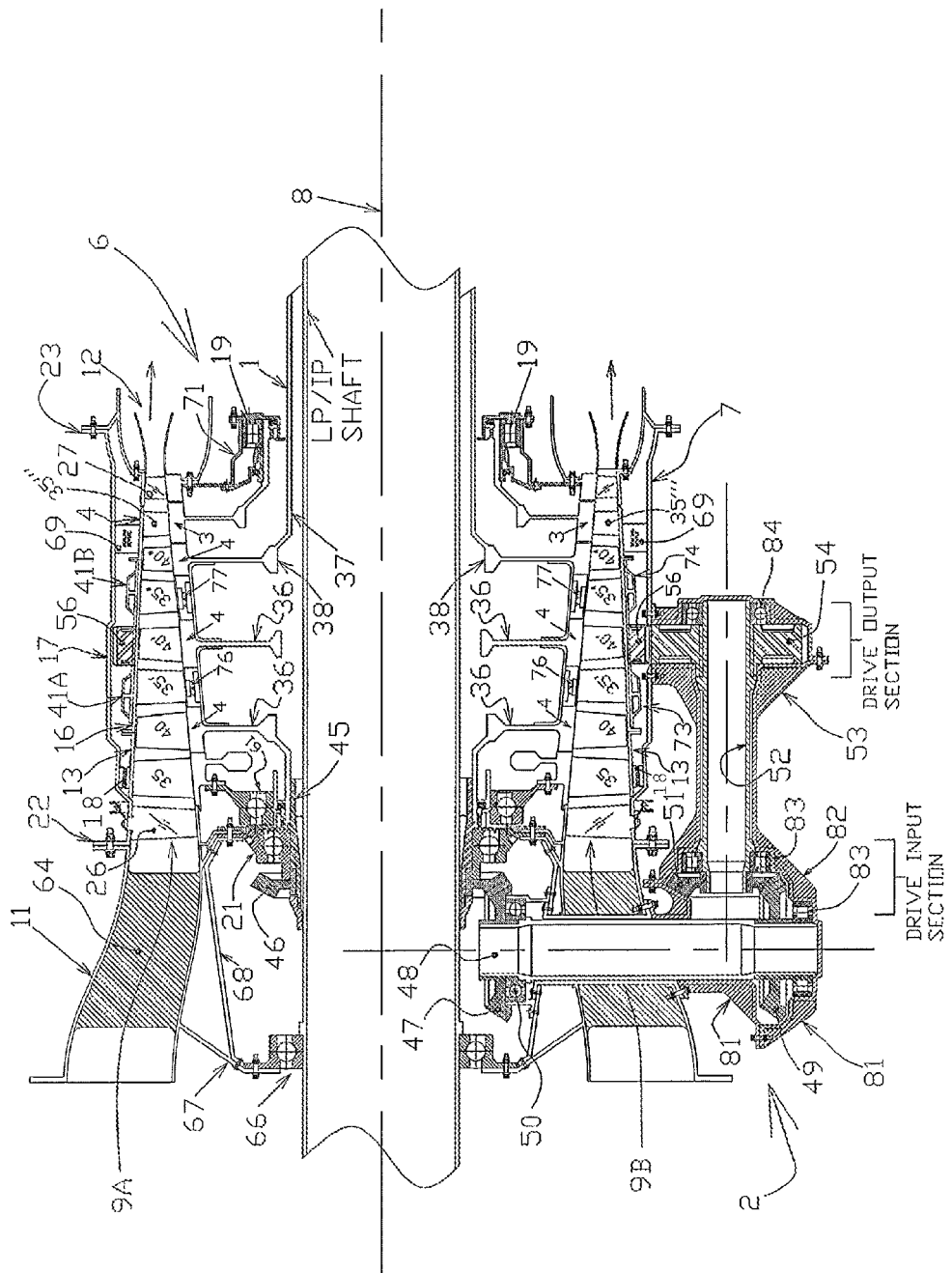
FIG. 1 is a side elevational view, taken in cross-section, of one embodiment of an axial compressor with rotating and sequentially counter-rotating vanes driven by an accessory drive according to the principles of the present invention.

The following detailed description is provided as an enabling teaching of embodiments of the invention. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptions to the embodiments described are possible and may even be desirable in certain circumstances. Thus, the following description is provided as illustrative of the principles of the invention and not in limitation thereof, since the scope of the invention is defined by the claims.

This application is related to co-pending and commonly assigned U.S. application Ser. No. 13/768,252. The co-pending application discloses embodiments of multi-stage axial compressors incorporating counter-rotating stages capable of being operated off a single driveshaft. A first series of rotor blade assemblies are mounted on and rotate with the driveshaft, each rotor blade assembly comprising a rotating stage of the multi-stage axial compressor. A second series of rotor blade assemblies are mounted on the driveshaft, each rotor blade assembly comprising a counter-rotating stage of the multi-stage axial compressor and is connected to the first series of rotor blade assemblies by at least one planetary gear assembly for causing counter-rotation of the second series of rotor blade assemblies. This co-pending patent application is hereby incorporated by reference in its entirety into this description.

Referring now to the drawings in greater detail in which like numerals indicate like parts throughout the several views, FIGS. 1-7 generally illustrate exemplary embodiments of an axial compressor for an engine with sequentially counter-rotating rotor or airfoil assemblies driven off of a single, substantially centrally-aligned driveshaft 1. In the embodiments illustrated, a solution is presented to implementing sequential counter-rotation in a multi-stage axial compressor C, and which, as noted, further incorporates an accessory drive system 2 for driving counter-rotating rotor assemblies 3 in a direction counter to or opposite from rotor assemblies 4 driven directly and in the same rotary direction as the driveshaft 1, with thrust loads associated with the driving of the rotor assemblies 4 and counter-rotating rotor assemblies 3 transferred to the engine frame. In the illustrated embodiments, the counter-rotation for the axial compressor C is achieved using a single driveshaft 1, typically being driven or torqued by a turbine (not shown) associated with the compressor as part of the engine, such as for aircraft.

Figure 2:
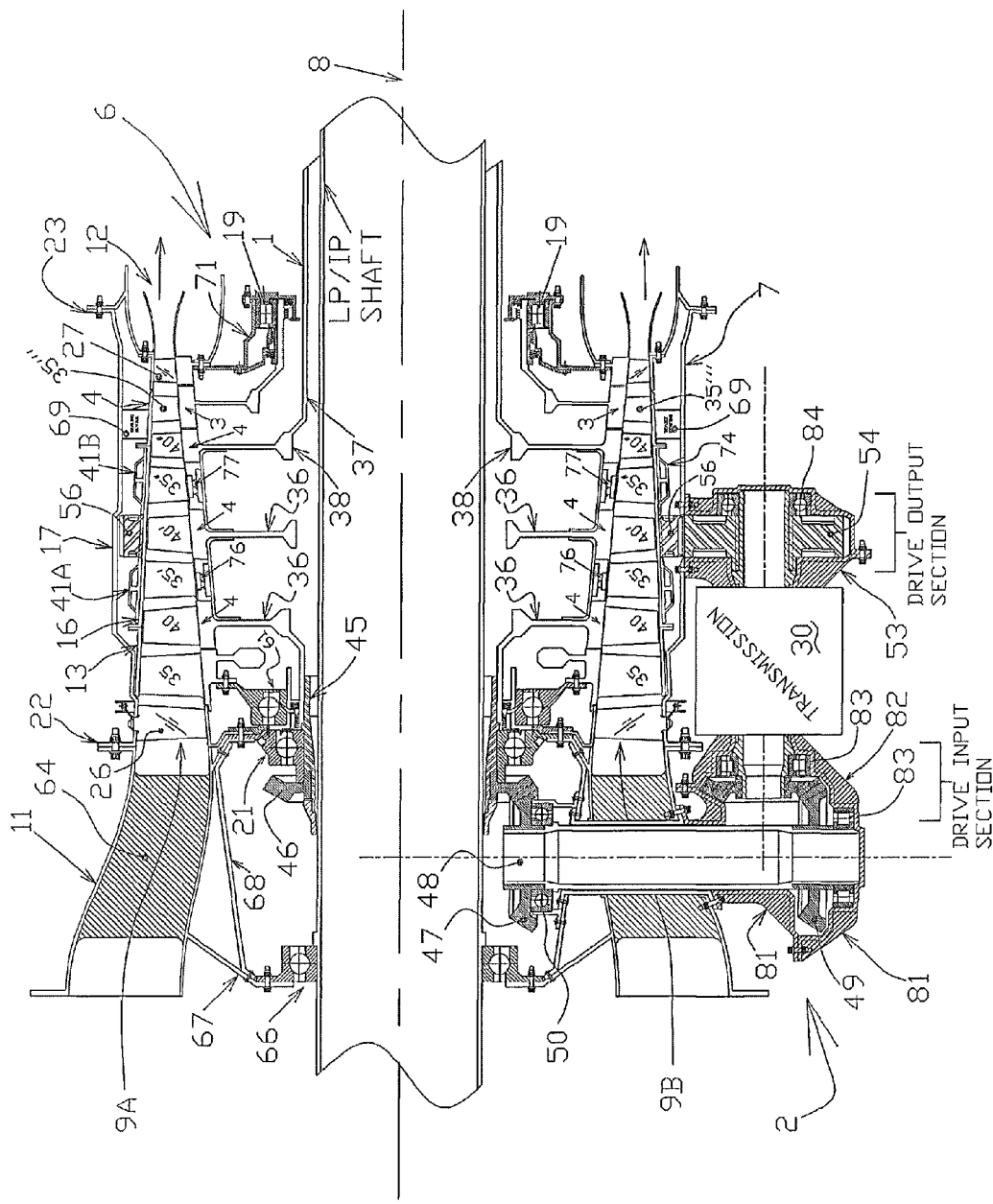
FIG. 2 is a side elevational view, taken in cross-section, illustrating an alternative embodiment of an axial compressor with rotating and sequentially counter-rotating vanes driven by an accessory drive and a transmission assembly according to the present invention.

As illustrated in FIGS. 1 and 2, the axial compressor C generally includes an elongated, tubular body 6 having a compressor case or housing 7 that surrounds and extends along the driveshaft 1 about a central axis 8. Airflow paths indicated by arrows 9A and 9B in FIGS. 1-2, are defined through the compressor on opposite sides of the driveshaft 1, with each of the airflow paths extending from an inlet 11 along a longitudinally extending path to an outlet or discharge end 12, along which the flow of air moving along such pathways 9A and 9B is compressed by the axial compressor so as to substantially increase the pressure of the airflow as the airflow passes through each of the rotating and counter-rotating rotor assemblies 4/3 of the stages 13 of the compressor C.

The case or housing 7 of the compressor C typically can include two sections or parts, including a rotating inner case or drum housing 16 to which the counter-rotating rotor assemblies 3 are mounted so as to be carried/rotated thereby, and a static outer case or drum housing 17 generally connected to the inner case 16 by bearings 18 to support the inner case while also enabling rotation thereof. The static outer case further will be connected to and supported on the driveshaft 1 by bearings 19/21 as indicated in FIGS. 1-2. Fore and aft flanges 22 and 23 can be mounted to/or formed with the compressor case 17. These fore and aft flanges generally assist in the connection of the compressor to other engine components, such as an intermediate pressure compressor (IPC), diffuser/combustor and other engine components, as will be understood by those skilled in the art. The flanges 22 and 23 further can connect and secure a fixed inlet stator guide vane (IGV) 26 and a fixed outlet stator guide vane (OGV) 27, respectively, at the fore (inlet) 11 and aft (outlet) ends 12 of the compressor. The inlet and outlet guide vanes generally will be substantially fixed in place and typically will be oriented at a desired stagger angle selected to meet desired operating conditions of the compressor, and it will be understood that such stagger angles for the inlet and outlet guide vanes further can be varied as needed depending upon the desired operating conditions of the compressor.

In the illustrated embodiments of FIGS. 1-2, the compressor driveshaft 1 generally will be connected directly to each of the first series or set of rotating rotor or airfoil assemblies 4 so as to directly drive these rotating rotor assemblies 4 in the same direction as the rotation of the driveshaft 1. For example, if the driveshaft is driven in a generally clockwise direction, the first, rotating airfoil assemblies likewise will be driven in a clockwise direction, whereas if the driveshaft is rotated in a counter-clockwise direction, the rotor assemblies 4 generally also will be driven in a counter-clockwise direction. The second series or set of rotor or airfoil assemblies 3 are provided as counter-rotating airfoil assemblies, and will be rotated in an opposite direction to the first series or set of rotating rotor assemblies 4 and the driveshaft being driven in a counter-rotating movement by the drive assembly 2 in response to the rotation of the driveshaft. This second series or set of counter-rotating airfoil assemblies further can be rotated at different or varied speeds with respect to the first series of rotating airfoil assemblies such as by the use of a gear box transmission 30, as shown in FIG. 2 and/or other alternative gearing drive arrangements 31-32, as shown in FIGS. 6-7.

As FIGS. 1 and 2 further illustrate, the rotating rotor or airfoil assemblies 4 each generally will include a rotor blade 40 arranged at a desired stagger angle and attached to or formed with an inwardly projecting support member or disc 36. Each of the inwardly projecting support members or discs 36 of the rotating rotor assemblies 4 further can be attached to the driveshaft either directly or via a connector spline/flange 37 to a coupling or compressor disc 38, which connects the rotor assemblies 4 to the driveshaft such as by fasteners, such as rivets, bolts, or by welding, etc., so as to be directly driven by the rotation of the driveshaft 1, as will be understood by those skilled in the art. Alternatively, the support discs 36 of the rotating airfoil assemblies 4 could be integrally formed with the driveshaft, such as by extrusion, or could be otherwise fixedly secured to the driveshaft by welding, etc.

As additionally shown in FIGS. 1 and 2, the second or counter-rotating airfoil assemblies 3 generally will be mounted to the inner rotating case or drum housing 16, and can be indirectly connected or linked to the driveshaft 1 by the accessory drive system 2 in order to drive the counter-rotating airfoil assemblies 3 in an opposite direction counter to the rotation of the driveshaft 1 and rotating airfoil assemblies 4. Each of the counter-rotating airfoil assemblies 3 can have a similar design and/or construction to that of the rotating airfoil assemblies 4, including an airfoil blade or vane 35, connected to the drum housing or case 16 as indicated at 41A-41B.

In one embodiment, the preliminary power for the accessory drive system 2 for the compressor comes from the driveshaft 1 which is torqued by a turbine assembly associated therewith. The airfoil or rotor blades labeled 40, 40', and 40" of the rotating airfoil assemblies 4 that are directly connected to the driveshaft 1 by flanges/discs, which are additionally splined and connected to a coupling 45 (FIG. 3), which coupling 45 is further connected to a first bevel gear 46 of the accessory drive system 2.

As illustrated in FIGS. 1 and 2, the accessory drive system 2 generally includes the first bevel gear 46 which engages with a second bevel gear 47 on the opposite side of the driveshaft 48, supported by bearings 50. The torque from bevel gear 46 is transferred to bevel gear 49 through shaft 48, and as bevel gear 49 engages with gears 51 arranged about a secondary driveshaft 52 so that the torque is transferred to a spur gear assembly 53 through the secondary shaft 52. The spur gear assembly 53 includes a first spur or helical gear 54 that engages with and drives a second spur gear 56 which sits on the inner casing 46. The transfer of torque through this mechanism causes the inner casing 16 to rotate counter to the compressor drum and driveshaft 1, thus causing blades 35, 35', and 35" to counter rotate with blades 40, 40', and 40". It should be noted that the angle between gear axis of the first and second bevel gears 46 and 47 and the gears 49 and 51 gearing pairs need not be exactly 90 degrees, but can be adjusted to meet design requirements.

The thrust load developed by the compressor drum is transferred to the engine frame via a thrust bearing assembly 21. Similarly, thrust loading produced by the rotating case is transferred to the engine frame through a bearing assembly 61. The rotating case is also radially supported on its aft end by roller bearing 19. As shown in FIG. 1, bearings 21 and 61 transfer thrust loads to engine frame via an aerodynamic strut 64. Thrust loadings from the secondary or low pressure shaft 52 (if applicable) can also be transferred to this strut 64 via a thrust bearing 66 as shown in FIG. 1, which is connected to flanges 67 and 68.

Elements 69, indicated in FIGS. 1-2 are case air seals, which prevent the leakage of pressurized air from the aft of the compressor to cavity between the rotating case and the support structure. Additional seals also have been displayed, although their location, placement, etc., can be varied. For example, inter-stage air seals 76 and 77 also can be provided along rotating airfoil assemblies 4 as indicated in FIG. 1.

At the end of the compressor, the OGV also acts as a load-bearing device, carrying radial loads from bearing 19 via flange 71. In use of the compressor as a HPC, then the OGV also can be connected to an exit diffuser and burner flanges as shown. The IGV similarly helps in correcting air incidences at off design conditions. The IGV can swivel with the help of a control horn. Additional struts 73/74 further can be provided to withstand compression loads from counter-rotating vanes 40 and 40'.

Parts 81 and 82 form the housing for the gear pairs. The section where the bevel part 82 engages with bevel gear 51 is called the drive INPUT section and similarly the section where the spur or helical gear 54 mates with the spur gear 56 of the inner casing 16 is called the drive OUTPUT section. Support bearings 83 and 84 provide support for the gears and secondary driveshaft of the accessory drive system.

FIG. 2 shows an embodiment where the additional transmission or gear box/gear reducer mechanism 30 could be placed around the secondary shaft 52. It will be understood that the transmission could be arranged in other locations as needed to provide additional freedom of design of the compressor of the present invention.

Figure 3:
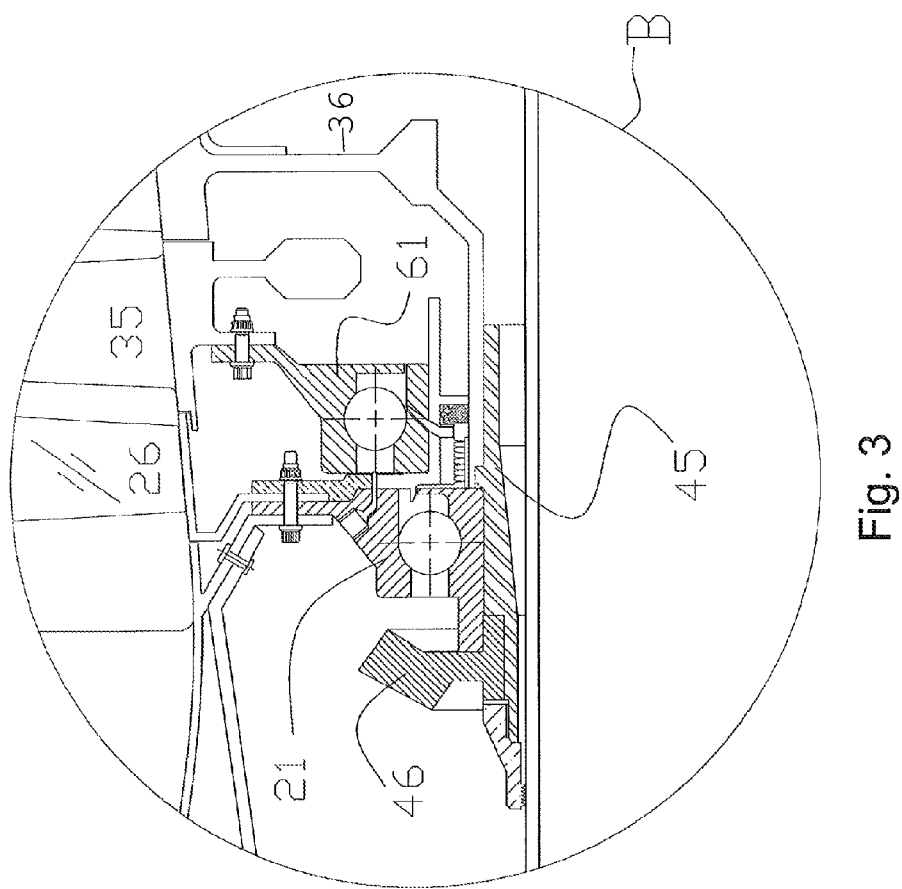
FIG. 3 is a side elevational view, taken in cross-section, illustrating the forward compression drum/case bearing support assembly for the axial compressor.

FIG. 3 shows an enlarged/detailed view of the forward case/compression drum bearing 21 and coupling support arrangement 45.

Figure 4A:
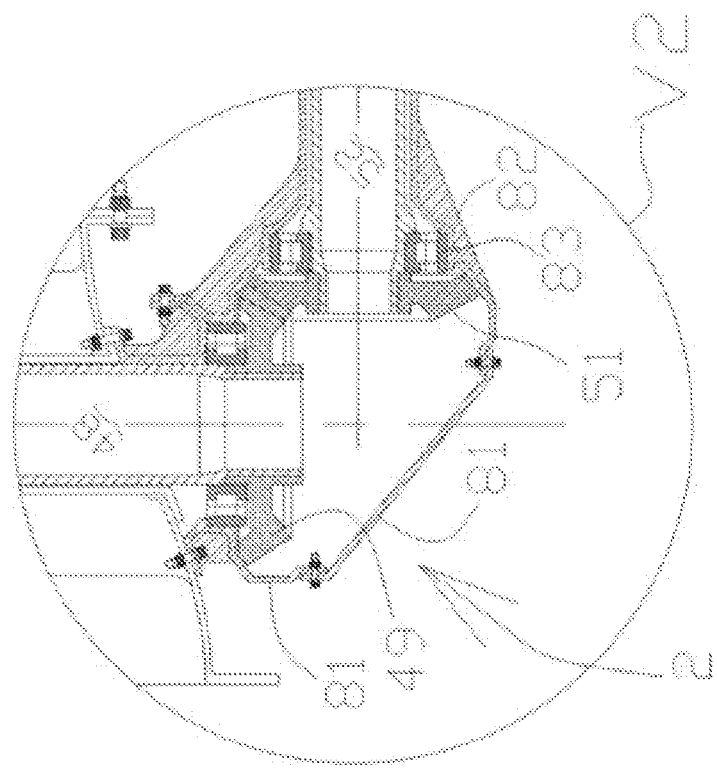
FIGS. 4A-4B are side elevational views, taken in cross-section, illustrating alternative exemplary embodiments of gear pairings for the accessory drive.
Figure 4B:
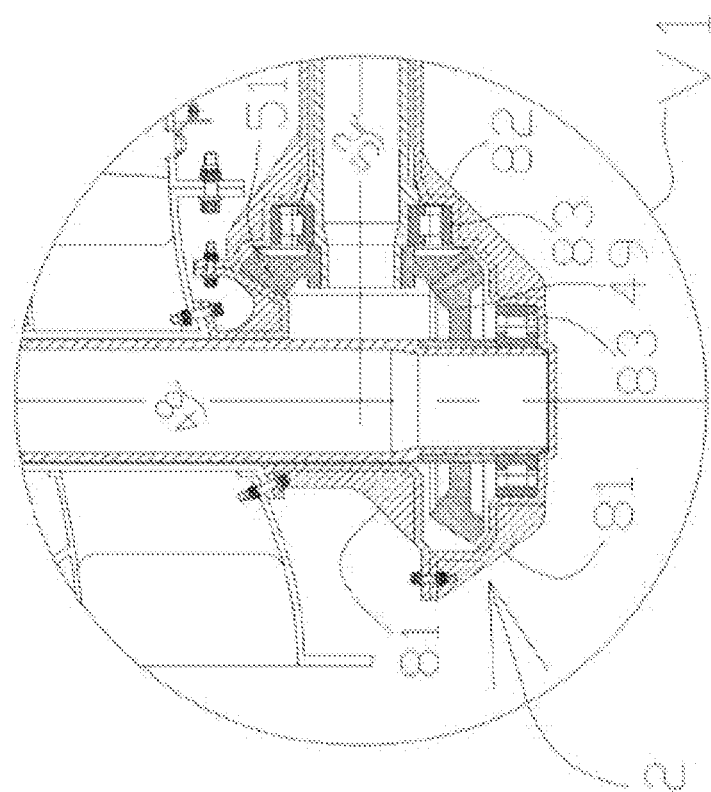

FIG. 4 shows different potential embodiments for possible arrangements of the gear pairs 49 and 51.

Figure 5:
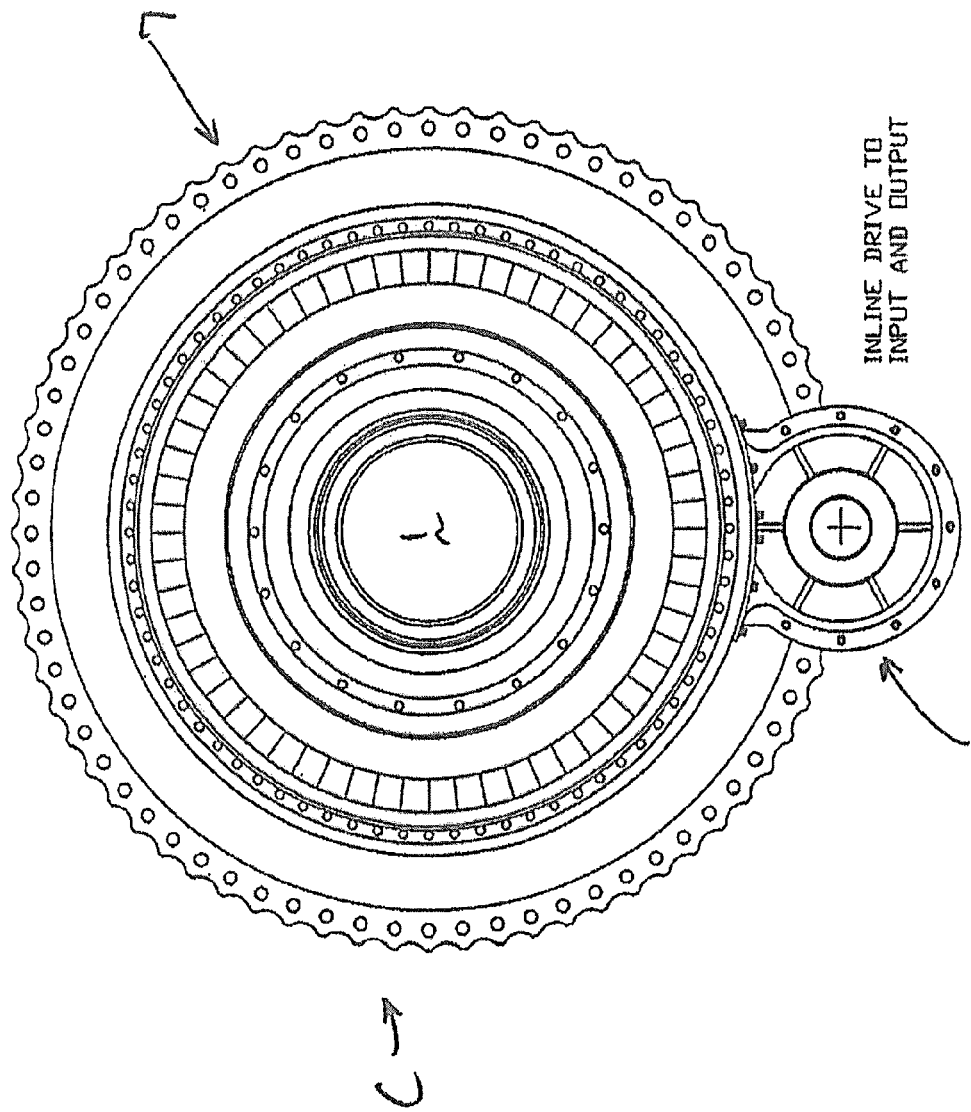
FIG. 5 is an end view of the axial compressor with the accessory drive.

FIG. 5 shows a rear view of the compressor with the accessory drive system 2 in a direct drive/in-line type arrangement.

FIG. 6 shows an embodiment where the accessory drive system 2 could be incorporated with an accessory gearbox 30 including multiple gears 90 for varying the speed at which the counter-rotating vanes are driven.

FIG. 7 shows an embodiment where the transmission 30 is replaced with a gear train 95 and the input and output drive sections that are not concentric.

As a result, the structure of the disclosed embodiments provide for an axial compressor that incorporates sequential counter-rotation of selected airfoil blades/vanes, driven off a single driveshaft, without requiring stator vanes to assist in the management and control of high tip Mach numbers and incidence angles of the airflows passing through the compressor as can occur with such counter-rotating structures. The disclosed embodiments further provides greater flexibility to the design of the compressor to enable faster or slower counter-rotation as needed depending upon the design and operational requirements of the compressor and engine in which the compressor is employed. Accordingly, from an aerodynamic standpoint, the rotating and counter-rotating airfoil assemblies can be provided with their own speed or RPMs, enabling the custom designing of a more optimal aerodynamic operation of the compressor based upon desired/necessary performance requirements. In addition, from a mechanical standpoint, separate epicyclic gear assemblies driving each of the counter-rotating airfoil assemblies may be used with embodiments of the present disclosure so as to enable the counter-rotating and rotating airfoil assemblies to be decoupled such that if there is a problem with engine vibrations being transmitted through the compressor, such vibrations will not be transmitted to all the airfoil structures of the compressor.

The corresponding structures, materials, acts, and equivalents of all means plus function elements in any claims below are intended to include any structure, material, or acts for performing the function in combination with other claims elements as specifically claimed.

Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the invention is defined solely by the appended claims.

The invention claimed is:

1. A multi-stage axial compressor for an engine, comprising:
    a driveshaft;
    a first series of rotor blade assemblies mounted on and driven by the driveshaft in a first direction so that the first series of rotor blade assemblies defines a rotating stage of the multi-stage axial compressor;
    a second series of rotor blade assemblies driven in a second direction counter to the first direction so that the second series of rotor blade assemblies defines a counter-rotating stage of the multi-stage axial compressor; and
    an accessory drive assembly linking the second series of rotor blade assemblies to the driveshaft, the accessory drive assembly comprising a plurality of driven shafts, including a first driven shaft coupled to the driveshaft by a first gear assembly configured to transfer power between the driveshaft and the first driven shaft, and a second driven shaft arranged in a transverse direction with respect to the first driven shaft and connected thereto by a second gear assembly such that the second driven shaft is driven by the driveshaft, wherein the second driven shaft is in communication with the second series of rotor blade assemblies to drive the second series of rotor blade assemblies in a counter-rotating direction to the direction of rotation of the first series of rotor blade assemblies, wherein the first gear assembly of the accessory drive assembly comprises a first gear mounted along the driveshaft and a second gear mounted along the first driven shaft, the first gear engaging with the second gear so as to transfer power between the driveshaft and the first driven shaft, and wherein the second gear assembly comprises a third gear mounted along the first driven shaft and configured to engage a plurality of gears arranged about the second driven shaft.

2. The multi-stage axial compressor of claim 1, further comprising a compressor housing including a rotating inner casing to which the second series of rotor blade assemblies are mounted, and a static outer casing supported on the driveshaft by a series of bearings.

3. The multi-stage axial compressor of claim 2, wherein the accessory drive assembly is mounted external to the compressor housing.

4. The multi-stage axial compressor of claim 2, further comprising a plurality of case air seals to prevent leakage of pressurized air from an aft section of the multi-stage axial compressor.

5. The multi-stage axial compressor of claim 1, further comprising a spur gear assembly connected to the second driven shaft for receiving torque transferred from the plurality of gears arranged about the second driven shaft.

6. The multi-stage axial compressor of claim 5, wherein the spur gear assembly comprises a spur or helical gear disposed along the second driven shaft that engages a second spur gear mounted to the rotating inner casing so as to transfer torque to the rotating inner casing.

7. The multi-stage axial compressor of claim 6, wherein the second spur gear is mounted on the inner casing, the spur gear assembly transferring torque to cause the inner casing to rotate counter to the driveshaft.

8. The multi-stage axial compressor of claim 1, further comprising at least one flange configured to directly connect the first series of rotor blade assemblies to the driveshaft.

9. The multi-stage axial compressor of claim 8, further comprising inlet and outlet axial guide vanes, the inlet guide vanes mounted at a fore end of the multi-stage axial compressor preceding the first and second series of rotor blade assemblies, the outlet guide vanes mounted at an aft end of the multi-stage axial compressor following the first and second series of rotor blade assemblies.

10. The multi-stage axial compressor of claim 1, further comprising a fore flange and/or an aft flange wherein the flange connects a plurality of configured to connect one or more engine components to the compressor.

11. The multi-stage axial compressor of claim 1, further comprising a thrust bearing assembly for transferring a thrust load generated by the multi-stage axial compressor to an engine frame.

12. The multi-stage axial compressor of claim 1, wherein each rotor blade assembly in the first series comprises a plurality of rotor blades arranged at a predetermined stagger angle and attached to, or formed with, an inwardly projecting support member connected to the driveshaft by a connector spline or flange.

13. The multi-stage axial compressor of claim 1, wherein the accessory drive assembly further comprises a transmission coupled to the second driven shaft and configured for varying a rotational speed of the second series of rotor blade assemblies.

14. A multi-stage axial compressor, comprising:
a housing including a rotating inner casing and a static outer casing;
a driveshaft rotating in a first direction;
a first series of rotor blade assemblies coupled to and rotating with the driveshaft in the first direction so as to define a rotating stage of the multi-stage axial compressor;
a second series of rotor blade assemblies coupled to the rotating inner casing and driven in a second direction so as to define a counter-rotating stage of the multi-stage axial compressor; and
an accessory drive assembly comprising a first accessory shaft and a second accessory shaft, the first accessory shaft including a series of bevel gears mounted thereabout, wherein at least one of the bevel gears engages with a corresponding gear mounted on the driveshaft for transferring power from the driveshaft to the first accessory shaft, and at least another one of the bevel gears of the series of bevel gears engages one or more gears arranged along the second accessory shaft, and wherein the second accessory shaft includes a spur gear assembly coupled thereto and including at least one spur gear that engages a corresponding spur gear coupled to the inner casing so as to transfer torque from the driveshaft to cause the inner casing and second series of rotor blade assemblies coupled thereto to rotate counter to the rotation of the first series of rotor blade assemblies.

15. The multi-stage axial compressor of claim 14, further comprising a transmission gear box for rotating the second series of rotor blade assemblies at a different speed with respect to the first series of rotor blade assemblies.

16. The multi-stage axial compressor of claim 15, wherein the transmission gear box comprises a gear reducer mechanism.

17. The multi-stage axial compressor of claim 14, wherein the static outer casing surrounds and extends along the driveshaft about a central axis of the compressor.

18. The multi-stage axial compressor of claim 14, further comprising inlet guide vanes and outlet guide vanes fixedly mounted to the static outer casing.

19. The multi-stage axial compressor of claim 18, wherein the static outer casing includes fore and aft flanges mounted thereto or formed therewith.

20. The multi-stage axial compressor of claim 19, wherein the inlet and outlet guide vanes are mounted at inlet and outlet ends of the compressor by the fore and aft flanges.

21. The multi-stage axial compressor of claim 19, wherein the fore and aft flanges are configured to connect one or more engine components to the compressor.

22. The multi-stage axial compressor of claim 14, wherein the accessory drive comprises an input section and an output section.

23. The multi-stage axial compressor of claim 14, further comprising a flange for directly connecting the first series of rotor blade assemblies to the driveshaft.

24. The multi-stage axial compressor of claim 14, further comprising a thrust bearing for transferring a thrust load generated by the multi-stage axial compressor to an engine frame via an aerodynamic strut.

* * * * *